Figure 1:
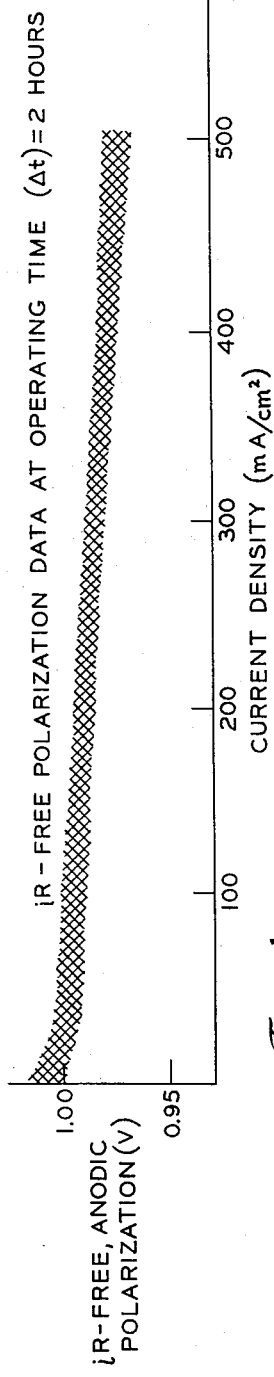

United States Patent [19]
Zeitner, Jr. et al.

[11] 3,772,086

[45] Nov. 13, 1973

[54] METHOD OF MAKING ANODES FOR HYDRAZINE FUEL CELLS

[75] Inventors: Edward J. Zeitner, Jr., Sterling Heights; Marion E. Wheatley, Warren; Romeo R. Witherspoon, Utica; Stuart G. Meibuhr, Birmingham, all of Mich.

[73] Assignee: General Motors Corporation, Detroit, Mich.

[22] Filed: July 17, 1972

[21] Appl. No.: 272,309

[52] U.S. Cl. .......................................... 136/120 FC
[51] Int. Cl. .......................................... H01m 27/04
[58] Field of Search .................... 136/129 FC, 120, 136/86 D; 252/432; 204/49, 290, 291; 117/130, 160, 227, 169

[56] References Cited
UNITED STATES PATENTS

| | | | |
|---|---|---|---|
| 3,183,123 | 5/1965 | Haworth | 136/120 FC X |
| 3,380,856 | 4/1968 | Pohl | 136/120 FC |
| 3,437,526 | 4/1969 | Lindholm et al, | 136/120 FC X |
| 3,513,028 | 5/1970 | Salomon | 136/120 FC X |

*Primary Examiner*—Anthony Skapars
*Attorney*—William S. Pettigrew

[57] ABSTRACT

A method of making nickel boride catalyzed anodes for hydrazine fuel cells including the step of co-depositing electrolytic nickel and carbonyl nickel particles onto an appropriate conductive substrate to form a catalyst-receiving surface. Sufficient electrolytic nickel is deposited to tack the carbonyl nickel particles to the substrate and to themselves, yet not so much as to appreciably degrade the characteristic rough and jagged surfaces of the carbonyl nickel particles.

4 Claims, 2 Drawing Figures

METHOD OF MAKING ANODES FOR HYDRAZINE FUEL CELLS

This invention relates to nickel boride catalyzed anodes for hydrazine fuel cells and more particularly to a method of making anodes which retain the nickel boride during the rigors of cell discharge. Nickel boride has been proposed as a catalyst for a number of reactions including the oxidation of hydrazine in fuel cells such as the hydrazine-air or hydrazine-oxygen cells. The term fuel cell is used herein to mean a current generating electrochemical cell in which fuel is continuously consumed at an anode and oxidant continuously consumed at a cathode with an appropriate ion-transporting electrolyte between and in contact with both. Closing an external circuit between the anode and cathode permits the withdrawal of useful electrical energy from the cell. In hydrazine-fueled cells, the hydrazine fuel is usually dissolved in an electrolyte, such as potassium hydroxide (KOH) and flows in contact with the anode, which comprises a suitable conductive support carrying a catalyst (i.e., nickel boride). The hydrazine-KOH solution forms the cell's anolyte. The cathode contacts a catholyte which, in the case of an air or oxygen cathode, comprises a potassium hydroxide solution without any dissolved hydrazine. The anolyte and catholyte are separated one from the other by a suitable membrane for impeding hydrazine transfer from the anolyte to the catholyte without impairing ionic mobility between anode and cathode.

One of the problems with nickel boride catalyzed hydrazine anodes is of short useful life especially at high anode current densities. A major contributor to the short useful life of hydrazine anodes is the violent oxidation reaction occurring at the anode which forms nitrogen in microexplosions adjacent the catalyst, the repeated occurrence of which batters and destroys the electrodes by dislodging the catalyst from the conductive support.

It is an object of this invention to provide a process for making a high surface area, conductive support capable of providing so firm an anchorage for the nickel boride catalyst that it is not so readily dislodged from the support during cell discharge whereby the anode's life is significantly increased. This and other objects and advantages of this invention will become more apparent from the detailed description which follows.

This invention, comprehends a process for making hydrazine anodes and more particularly a process for forming a catalyst-receiving surface on the conductive supporting member of the anode. The conductive supporting member may be formed of any conductive material, which is chemically resistant to the corrosive environment of the electrolyte and which has a large surface area for contacting the anolyte. In this regard, the macro-structure of the support should be such as to consume very little cell volume while still presenting a considerable amount of surface area to the anolyte flowing over or through it. For flow-through cell designs, such a support then could be made from open cell reticulated metal foam, wire mesh and/or loose felts of sintered metal fibers. For flow-over cell designs, impervious scrobiculated metal foils having dimpled or grooved surfaces are particularly desirable. Composition wise, stainless steel, carbon or the like may be used without concern for corrosion, but nickel is preferred since it not only resists corrosive attack but is easy to fabricate and has a low resistivity.

The surface of the support is treated to provide a plurality of firmly bonded anchorage sites for receiving and holding nickel boride catalyst. To this end, the conductive support is made the cathode in a nickel electroplating bath containing carbonyl nickel particles suspended therein. As electrolyzing current passes through the electroplating cell, electrolytic nickel is deposited onto the surface of the support and carries with it some of the suspended particles. Hence the carbonyl nickel particles are co-deposited along with the electeolytic nickel which electrolytic nickel acts as a matrix, firmly tacking and holding the carbonyl nickel particles onto the surface of the support.

Carbonyl nickel particles which are produced by the decomposition of nickel carbonyl, vary in size from about 2 to about 10 microns and have a distinctive or characteristic rough and jagged surface as seen in V. A. Tracey and N. J. Williams, Electrochemical Technology, Jan.-Feb., 1965. It is important that the rough surface of the carbonyl nickel be retained and hence not degraded during electrolysis of the nickel bath. It is essential that only enough electrolytic nickel be deposited to firmly bond the carbonyl nickel particles to the support. Should too much electrolytic nickel be deposited, the particles, which deposit therewith, become coated and their characteristic rough surface is lost to the point where eventually they no longer provide the excellent nickel boride anchorage sites contemplated by this invention. More specifically, the niclel equivalent of at least 5 coulombs per square centimeter of support surface should be deposited to insure sufficient tacking of the particles to the support. At the other extreme, it has been noted that when more than about 24 coulombs per square centimeter of support surface is used the rough texture was lost and the nickel boride quickly shed in the cell. It is not necessary to have a particularly thick layer of the nickel-bound particles so long as they are firmly bound in the electrolytic nickel and are spread uniformly across the face. In this regard, no particular benefits are achieved above a preferred loading of about 10 milligrams of carbonyl nickel per square centimeter of support surface. Hence, though more can be used, it is uneconomical to do so. On the other hand, at least about two milligrams of carbonyl nickel per square centimeter of support surface is required to insure adequate take up and anchorage of the nickel boride catalyst.

The benefits of this invention are available regardless of the particular nickel plating bath used and hence any of the conventional low or high stress baths known in the art may be employed for obtaining the electrolytic nickel matrix. In a preferred form of the invention, the carbonyl nickel particles are suspended by stirring in a nickel sulfamate bath, the support is positioned horizontally near the bottom of the plating cell and the stirring discontinued after about the first 10 percent (10 percent) of the plating is completed leaving the particles to settle out or gravitate onto the support during the remainder of the plating cycle. The plating time itself should be extended to at least 2 minutes and preferable about five minutes or more after the stirring has stopped to insure adequate settling of the particles into the support.

The thusly prepared substrate is next catalyzed by forming nickel boride in situ on the nickel-bound carbonyl nickel particles. This should be done using formation techniques in which the nickel boride forms below about 400°C., since it has been observed that the carbonyl nickel particles tend to sinter or coalesce resulting in a loss of their rough, jagged surface when exposed to temperatures above about 400°C. for any substantial period of time. It is preferred to form the nickel boride on the support by the known process of first immersing the support into a solution of a nickel salt and subsequently immersing it into a solution of an alkali metal borohydride which converts the nickel salt to nickel boride and forms a corresponding alkali metal salt and hydrogen. Several repetitions of this process provides a sufficient amount of nickel boride on the surface. The aforesaid immersion process is essentially a room temperature reaction having no control problems and results in an intimate engagement between the nickel boride and the nickel-bound carbonyl nickel particles. The solvent for the nickel salt and alkali metal borohydride is not particularly significant and accordingly may either be water or an organic, so long as it will dissolve a sufficient amount of the salt or borohydride as to provide a practically useful concentration. Aqueous solutions are preferred for both reactants, but alcohol may be used for the nickel salts and alcohol and the dimethyl ether of diethylene glycol may be used for the borohydride (e.g., sodium borohydride). Among the soluble, reducible nickel salts that can be used here are the chlorides, acetates, bromides, nitrates, and mixtures thereof, with the acetate being preferred. Useful borohydrides can be taken from the alkali metal group of sodium, potassium, lithium, cesium, and rubidium borohydrides, but as a practical matter, only the lithium, sodium and potassium borohydrides need be considered since they are commercially available. One of the principal advantages of using the alkali metal borohydrides is the fact that the alkali metal salt formed from the anion of the nickel salt is much more soluble than the nickel boride formed and hence removal of all of the reaction products but the nickel boride is readily accomplished by mere rinsing in water.

As an example of the invention, dimpled nickel foils (0.05 mm thick) were electroformed on a chromium-plated, stainless steel mandrel from an 18 liter nickel sulfamate and nickel chloride bath comprising 300 grams per liter nickel sulfamate, 6 grams per liter nickel chloride and 30 grams per liter boric acid (pH 2.3 – 4.0). The geometric area of the dimpled foil was 48 cm². Carbonyl nickel particles (Inter-National Nickel Co.) were then electrolytically co-deposited onto the electroformed foils using a vertical half-box arrangement with the foils at the bottom and using 500 ml of the aforesaid nickel sulfamate electroforming solution and 500 milligrams of carbonyl nickel. A nickel anode screen was spaced above the foil to provide an electrode gap of 62 mm. A potential was established between the foil and the screen and the nickel bath added to the cell. The stirrer was energized followed by the addition of the carbonyl nickel. Stirring continued for 1 minute and then stopped. Plating continued for about 9 minutes after stirring stopped for a total of about 10 minutes total plating time at a current density of about 0.04 amps/cm² of the support's geometrical area. In other tests, a high-stress (300 g/l $NiCl_2$) nickel plating bath was successfully used to co-deposit the carbonyl powder.

Two carbonyl Ni powders were used in this study — International Nickel Mond 255 and Mond 128, and in co-deposition bath concentrations of about 1 gram per liter. Lower powder concentrations are useable but the plating time must then be extended to insure an adequate build-up of particles on the surface. Similarly, higher powder concentrations may be used but should not be so high as to produce so high a settling rate that the electrolytic nickel will not adequately bind the particles at a given plating rate. Their particle sizes were approximately 3 and 8 micrometers for the Mond 255 and Mond 128 powders, respectively. Samples were prepared over the range of about 5 coulombs/cm² to about 72 coulombs/cm² with the results discussed above. Various stirring speeds were used from 1,000 to 10,000 rpm, but there was virtually no effect of stirring speed on the surface structure and texture of these substrates. Hence, for most of the polarization stuides the substrates were prepared at 7,100 rpm.

The $Ni_2B$ catalyst was chemically formed in and on the carbonyl nickel by first dipping the support into a 5 % aqueous solution of nickel acetate for about 15 seconds, draining and then dipping it into an aqueous 10 % solution of sodium borohydride for about 30 seconds and rinsing. This procedure was repeated three times and the anodes tested immediately after the final rinse.

The catalyzed anodes (48 cm² active area) were operated at a constant current density of 200 mA/cm² for about 2 hours before the initial iR-free polarization data was taken. Test temperature was 31 ± 1° C. using a 33% KOH electrolyte containing 3.2% hydrazine and flowing over the anode at a rate of about 100 ml/min. At this flow rate, the fuel concentration was about 16 times the stoichiometric amount. Perforated stainless steel was used as the counter electrode at which hydrogen was evolved during testing. Polarization data were made daily and the anode was operated at 200 mA/cm² between polarization runs. The test was terminated when the anode-reference potential (using a Hg/HgO reference electrode) had fallen to −0.95V using a modified Kordesch-Marko interrupter to correct for solution iR-drop. The anodes were capable of operating for longer times at potential values below −0.95V, but this value was selected as the "cutoff" potential for evaluation purposes. The anolyte (as above) and catholyte (33% KOH) were separated by a microporous styrene acrylonitrile membrane material known as Acropor AN 200 sold by the Gelman Instrument Company.

Figure 2:
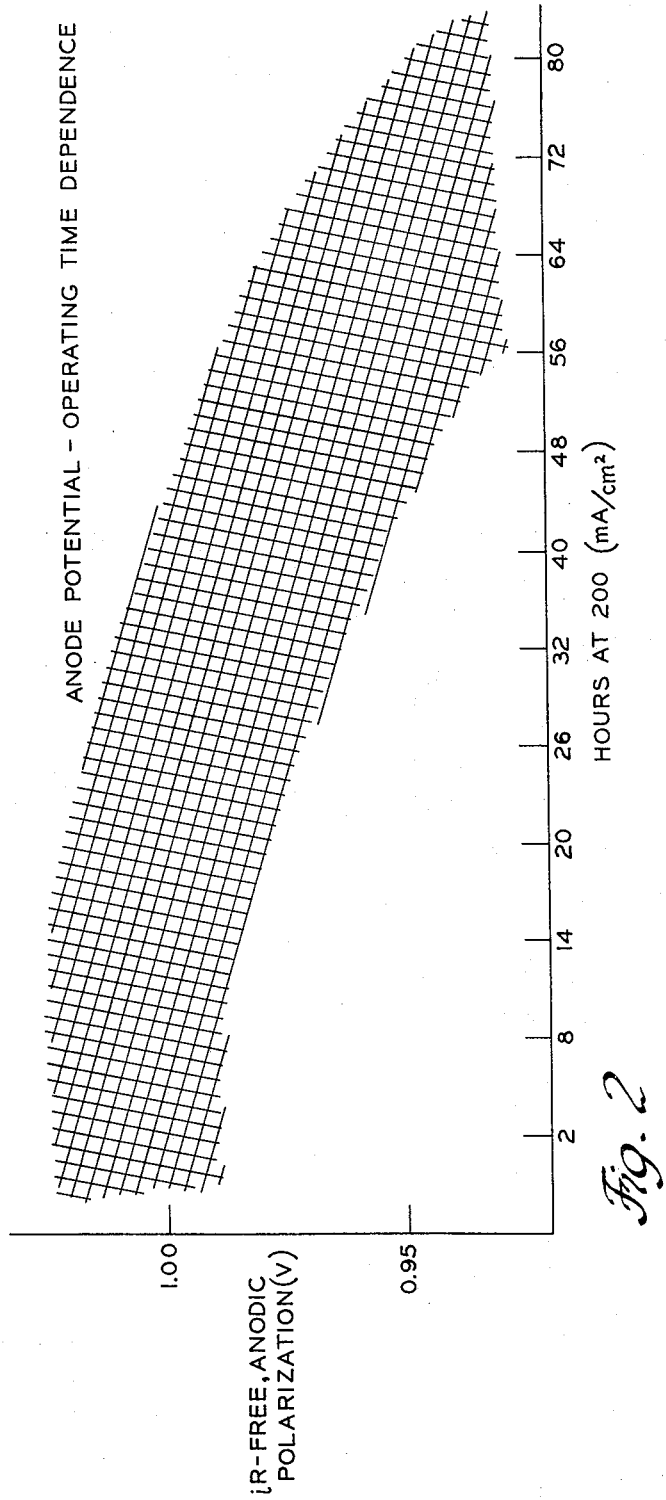

The polarization plot shown in FIG. 1 is typical for practically all the $Ni_2B$-catalyzed substrates at the beginning of the testing procedures. This plot is best represented by the spread as depicted by the shaded area. Duplicate runs, while not giving exactly the same potential values, did fall within the shaded area. The data in FIG. 2 portrays the time dependence of the anode potential; the time scale represents only that time the anode operated at 200 mA/cm². The anode, however, remained in contact with the KOH electrolyte for about four times greater number of hours than indicated by the operating times given in FIG. 2.

While we have disclosed our invention solely in terms of specific embodiments thereof we do not intend to be limited thereto, but rather only to the extent hereinafter set forth in the claims which follow.

We claim:

1. A method of making a fuel electrode for use in a hydrazine-fueled fuel cell including the steps of:
    a. making an electrically conductive support the cathode in a nickel electroplating cell;

b. filling the cell with a nickel plating bath containing suspended particles of carbonyl nickel;

c. passing at least about 5 coulombs per square centimeter of support and less than 24 coulombs per square centimeter of support through said cell to electrolyze said bath and plate electrolytic nickel onto the support while codepositing the particles onto the support along with the electrolytic nickel such that there is sufficient electrolytic nickel plated to securely tack the particles to the support yet an insufficient amount to appreciably degrade the characteristic rough and jagged surface of the carbonyl nickel particles;

d. contacting the support and wetting the nickel-bound particles thereon with a solution of a soluble nickel salt and solvent therefor; and e. contacting said wetted nickel-bound particles with a solution of an alkali metal borohydride and solvent therefor to form nickel boride in situ on the nickel-bound carbonyl nickel particles.

2. A method of making a fuel electrode for use in a hydrazine-fueled fuel cell including the steps of:

a. making an electrically conductive support the cathode in a nickel electroplating cell;

b. filling the cell with a nickel plating bath containing particles of carbonyl nickel;

c. suspending the particles in the bath above the support by rapidly stirring the bath for a predetermined time;

d. passing at least about 5 coulombs per square centimeter of support and less than 24 coulombs per square centimeter of support through said cell and over a time span which greatly exceeds said predetermined time to electrolyze said bath and plate electrolytic nickel onto the support;

e. codepositing the particles onto the support along with the electrolytic nickel during said predetermined time;

f. discontinuing said stirring after said predetermined time and allowing said particles to gravitate onto the support while continuing the nickel plating over said time span to electrolytically deposit sufficient electrolytic nickel onto the support to securely tack the particles to the support without appreciably degrading the characteristic rough and jagged surface of the nickel particles;

g. contacting the support and wetting the nickel-bound particles thereon with a solution of a soluble nickel salt and solvent therefor; and h. contacting said wetted nickel-bound particles with a solution of an alkali metal borohydride and solvent therefor to form nickel boride in situ on the nickel-bound carbonyl nickel particles.

3. The process according to claim 2 in which said predetermined time is about 10 percent ot the total plating time span and said time span extends for at least about five minutes.

4. A hydrazine anode for a hydrazine-fueled fuel cell comprising an electrically conductive support having at least about two milligrams of carbonyl nickel held in a matrix of electrolytic nickel for each square centimeter of said support and a nickel-boride catalyst formed in and firmly anchored to the carbonyl nickel particles.

* * * * *